United States Patent
Kalavakuru et al.

(10) Patent No.: US 11,616,609 B2
(45) Date of Patent: Mar. 28, 2023

(54) REDUCING LATENCY IN OFDMA USING FRONT ENDS WITH ADAPTIVE LINEARITY

(71) Applicant: Cisco Technology, Inc., San Jose, CA (US)

(72) Inventors: Sivadeep R. Kalavakuru, Akron, OH (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/302,805

(22) Filed: May 12, 2021

(65) Prior Publication Data

US 2022/0368477 A1 Nov. 17, 2022

(51) Int. Cl.
*H04L 5/00* (2006.01)
*H04L 1/00* (2006.01)
*H04B 1/04* (2006.01)

(52) U.S. Cl.
CPC ............ *H04L 5/0007* (2013.01); *H04B 1/04* (2013.01); *H04L 1/0003* (2013.01); *H04L 1/0009* (2013.01)

(58) Field of Classification Search
CPC ... H04L 5/0007; H04L 1/0003; H04L 1/0009; H04B 1/04
See application file for complete search history.

(56) References Cited

U.S. PATENT DOCUMENTS

| | | | |
|---|---|---|---|
| 10,856,281 B2* | 12/2020 | Wentink | H04L 69/323 |
| 2006/0271799 A1* | 11/2006 | Shiratake | G06F 1/3296 |
| | | | 713/300 |
| 2009/0323641 A1* | 12/2009 | Futagi | H04W 72/085 |
| | | | 370/335 |
| 2014/0185501 A1 | 7/2014 | Park et al. | |
| 2015/0312077 A1 | 10/2015 | Porat | |
| 2015/0319747 A1 | 11/2015 | Chu et al. | |
| 2017/0195964 A1 | 7/2017 | Smaini et al. | |
| 2020/0235889 A1 | 7/2020 | Gan | |
| 2020/0383052 A1* | 12/2020 | Zhou | H04L 25/0202 |
| 2021/0352604 A1* | 11/2021 | Yang | H04W 56/005 |
| 2022/0029772 A1* | 1/2022 | Wu | H04L 27/2602 |

* cited by examiner

*Primary Examiner* — Janice N Tieu
(74) *Attorney, Agent, or Firm* — Patterson + Sheridan, LLP (57) ABSTRACT

Embodiments herein describe assigning different linearity operating points of a front end of a radio to groups of user devices when transmitting data using OFDMA. That is, when transmitting a PPDU to a first group of user devices, an access point (AP) may set the front end of the radio to a lower linearity operating point than when transmitting a PPDU to a second group of user devices. Using a higher linearity operating point can increase the data rate used to transmit the PPDU—e.g., the AP can use a higher modulation coding scheme (MCS). This can reduce the time the PPDUs have to wait in a queue before being transmitted.

17 Claims, 5 Drawing Sheets

| GROUP A | |
|---|---|
| USER DEVICES 130 A - C | MCS 5 |

| GROUP B | |
|---|---|
| USER DEVICES 130 D - E | MCS 7 |

| GROUP C | |
|---|---|
| USER DEVICES 130 F - G | MCS 9 |

FIG. 5A

| GROUP A | | |
|---|---|---|
| USER DEVICES 130 A - E | MCS 7 | HIGHER LINEARITY |

| GROUP C | | |
|---|---|---|
| USER DEVICES 130 F - G | MCS 9 | LOWER LINEARITY |

FIG. 5B

REDUCING LATENCY IN OFDMA USING FRONT ENDS WITH ADAPTIVE LINEARITY

TECHNICAL FIELD

Embodiments presented in this disclosure generally relate to assigning different linearity operating points in a front end to different groups of user devices in orthogonal frequency division multiple access (OFDMA).

BACKGROUND

OFDMA is a multi-user version of the orthogonal frequency-division multiplexing (OFDM) digital modulation scheme. Multiple access is achieved in OFDMA by assigning subsets of subcarriers to individual users (or user devices). This allows simultaneous low-data-rate transmission from several users. Further, OFDMA permits the subcarriers in a channel bandwidth to be grouped into smaller portions called resource units (RUs). The individual RUs can be assigned to different user devices, which allows an access point (AP) to serve the user devices simultaneously during uplink and downlink transmissions. For example, the AP can transmit a single physical layer protocol data unit (PDDU) or data packet that contains RUs destined for different user devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes grouping a plurality of devices associated with an access point into at least a first group and a second group as part of orthogonal frequency-division multiple access (OFDMA) based on portions of the plurality of devices being at least one of in a similar area or a similar distance from the access point where the first group corresponds to a different linearity operating point of a front end in the access point than the second group. The method also includes transmitting a first PPDU for the first group using a first linearity operating point of the front end and transmitting a second PPDU for the second group using a second linearity operating point of the front end.

Another embodiment presented in this disclosure is an access point that includes a radio comprising a front end and a scheduler. The scheduler is configured to receive a grouping of a plurality of devices associated with the access point into at least a first group and a second group as part of OFDMA where the grouping of the plurality of devices is based on portions of the plurality of devices being at least one of in a similar area or a similar distance from the access point, and where the first group corresponds to a different linearity operating point of a front end in the access point than the second group. The scheduler also transmits a first PPDU for the first group using a first linearity operating point of the front end and transmits a second PPDU for the second group using a second linearity operating point of the front end.

EXAMPLE EMBODIMENTS

Embodiments herein describe assigning different linearity operating points of a front end of a radio to groups of user devices when transmitting data using OFDMA. That is, when transmitting a PPDU or packet (which are used interchangeable in the discussion below) to a first group of user devices, an access point (AP) may set the front end of the radio to a higher linearity operating point than when transmitting a PPDU to a second group of user devices. Using a higher linearity operating point can increase the data rate used to transmit the PPDU—e.g., the AP can use a higher modulation coding scheme (MCS). This can reduce the time the PPDUs have to wait in a transmission queue before being transmitted. For example, the AP may determine to use a higher linearity operating point of the front end when transmitting data to the group of user devices that is furthest from the AP. Doing so means the data can be transmitted faster using a higher MCS (thereby reducing the time PPDUs for other groups have to wait in the transmission queue) as well as increase the group size which can reduce the number of groups, and thus, the time each PPDU waits in a queue. For groups of user devices that are closer to the AP, the AP can use a lower linearity operating point of the front end which conserves power. Nonetheless, because the user devices are closer, the AP can still transmit PPDUs to these groups using a higher MCS. In this manner, the AP can use an adaptive front end which can transmit packets using different linearity operating points in order to reduce latency in its transmission queue.

Figure 1:
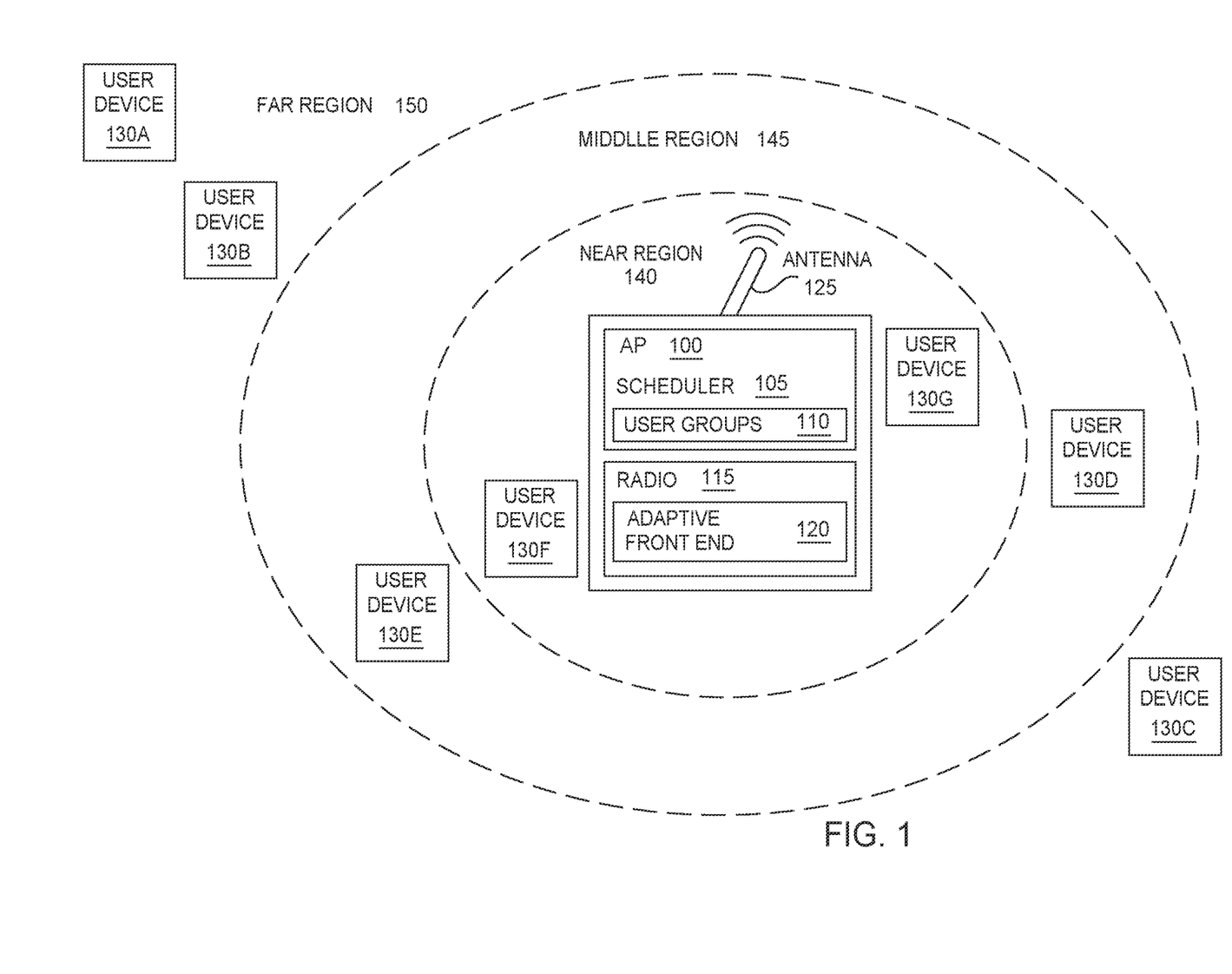
FIG. 1 illustrates a communication system where user devices are assigned into different groups for OFDMA, according to one embodiment.

FIG. 1 illustrates a communication system where user devices are assigned into different groups for OFDMA, according to one embodiment. FIG. 1 includes an AP 100 that is associated with multiple user devices 130A-G. As shown, the user devices 130 are arranged at different distances from the AP 100. In this example, the user devices 130A-C are in a far region 150, the user devices 130D-E are in a middle region 145, and the user devices 130F-G are in a near region 140. Due to the different distances between the AP 100 and the user devices, in general, greater transmit power is needed to communicate with the user devices 130 in the far region 150 than the user devices 130 in the middle and near regions 140, 145. Similarly, in general, greater transmit power is needed to communicate with the user devices 130 in the middle region 145 than the near region 140. Moreover, the AP 100 can, in general, use a faster data rate when transmitting data to the user devices 130 in the near region 140 than in the middle and far regions 145, 150. That is, the AP 100 may be able to use a higher MCS when communicating with the user devices 130 in the near region 140. Similarly, the AP 100 may be able to use a higher MCS when communicating with the user devices 130 in the middle region 145 than in the far region 150.

To take advantage of the different data rates, a scheduler 105 in the AP 100 (which can be implemented using software, firmware, hardware, or combinations thereof) assigns the user devices 130 into different user groups 110 where each group 110 can be sent data using the same PPDU or packet. That is, OFDMA permits the AP 100 to transmit a PPDU that includes RUs for multiple user devices 130. For example, the user devices 130 in each of the regions can be assigned to different user groups 110, where one PPDU or packet can carry RUs for the user devices 130 in that group 110. Doing so means the AP 100 can transmit data for multiple users in parallel using the same packet. Further, by grouping the user devices 130 according to what region they fall in, the packet can be transmitted using a MCS level tailored for that region. For example, when transmitting a PPDU containing RUs for the user devices 130A-C in the far region 150, the AP 100 may use MCS 5, when transmitting a PDDU for the user devices 130D-E in the middle region 145 the AP may use MCS 7, and when transmitting a PDDU for the user devices 130G-H in the near region 140 the AP may use MCS 9.

The AP 100 includes a radio 115 for communicating with the user devices 130 via an antenna 125. The radio 115 is a resource that is shared between the user groups 110. For example, the AP 100 may include a transmission queue that stores PPDUs or packets for the user groups 110 while the radio 115 is currently transmitting a PPDU or packet for a different group 110. Reducing the latency or time the packets wait in the transmission queue before being transmitted by the radio 115 is one advantage of the embodiments described herein. To reduce this latency, the radio 115 includes an adaptive front end 120 that has an adjustable linearity. In one embodiment, the front end 120 (e.g., a radio frequency (RF) front end) includes hardware such as one or more amplifiers, mixers, filters, oscillators, and the like. The front end 120 may be electrically disposed between the antenna 125 and an integrated circuit in the AP 100 that performs digital processing on data transmitted and received by the AP 100 via the antenna 125.

In one embodiment, the linearity of the front end 120 is adjustable by changing the operating voltage of the front end 120 (e.g., Vcc). For example, the linearity of the front end 120 can be improved by increasing the operating voltage. Increasing the linearity also increases the transmission power of the AP 100 which can in turn improve the signal to noise ratio (SNR) at the user devices 130. This permits the AP 100 to use a higher MCS to transmit the packets to the user devices 130, albeit at the cost of great power consumption in the front end 120. The embodiments below discuss different strategies of increasing the linearity of the front end 120 when transmitting packets to a particular one (or more) of the user groups 110 but using a lower linearity when transmitting packets to other user groups 110.

For example, in the far region 150, the user devices 130A-C are included in the same user group 110. However, the user device 130A may be further from the AP 100 than the user devices 130B and 130C. As a result, the AP 100 may only be able to transmit data using MCS 5 to the user device 130A, while the user devices 130B and 130C may be able to receive data at MCS 6. Nonetheless, since these user devices 130A-C are in the same group, the AP 100 is limited to transmitting the packet using MCS 5 to ensure all the user devices 130A-C can receive the packet. However, by improving the linearity of the front end 120 (by increasing its operating voltage), the transmission noise floor and error vector magnitude (EVM) of the front end 120 may be improved to sustain a higher MCS for the user device 130A which is at a cell edge of the AP 100. Continuing the example, increasing the linearity of the front end 120 may result in the AP 100 being able to transmit a packet to the user devices 130A-C using MCS 6 or 7. As a result, the packet can be transmitted in less time to this user group 110, which means packets destined for other user groups 110 (e.g., the user devices 130 in the middle and near regions 140, 145) wait less time in the queue.

Further, increasing the linearity of the front end 120 may permit additional user devices 130 to be added to the group. For example, when operating at the higher linearity, the AP 100 may be able to transmit a packet containing RUs for the user devices 130A-E at MCS 7. Thus, the scheduler 105 may decide to combine the user devices 130A-E in the far and middle regions 145, 150 into the same user group 110. Reducing the number of user groups 110 can also reduce the amount of time the packets wait in the queue.

Figure 2:
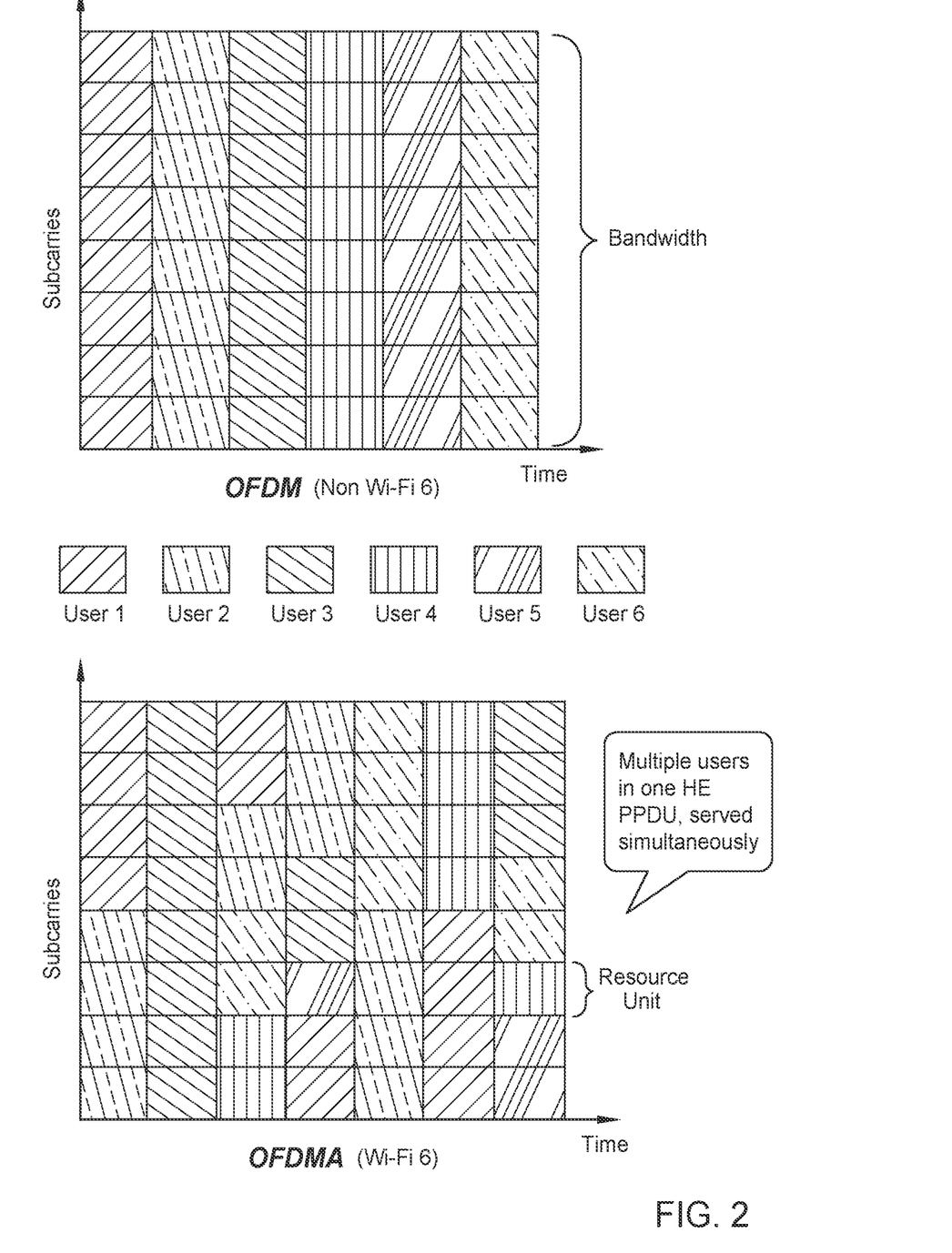
FIG. 2 illustrates OFDMA under non-Wi-Fi 6 and Wi-Fi 6, according to one embodiment.

FIG. 2 illustrates OFDMA under non-Wi-Fi 6 and Wi-Fi 6, according to one embodiment. That is, FIG. 2 illustrates how OFDMA on WiFi standards released before WiFi 6 versus how OFDMA can be performed in a WiFi 6 (i.e., any 802.11 standard that is faster than 802.11ac), or later, deployment. For non-(or pre) WiFi 6 deployments, a packet is assigned to the same user (or user device). After WiFi 6, a packet can be subdivided into RUs which can be destined for different user devices.

In the non-limiting example illustrated in FIG. 2, each packet has eight RUs, where each RU can be individually assigned to a different user device. All eight RUs can be assigned to the same user device, different subsets of the RUs can be assigned to different user devices, or all eight RUs can be assigned to different user devices (assuming there are at least eight user devices associated with the AP). Moreover, the time axis (i.e., the X axis) illustrates the AP transmitting seven PPDUs or packets, where the RUs in each of the packets are assigned differently to the users.

In one embodiment, when using OFDMA in a WiFi 6 (or later) deployment, each packet shown in FIG. 2 can correspond to a different user group 110 in FIG. 1. For example, during a first time period, the AP may transmit a packet that has RUs assigned to the user devices 130 in a first user group, during a second time period, the AP transmits a packet that has RUs assigned to the user devices 130 in a second user group, during a third time period, the AP may transmit a packet that has RUs assigned to the user devices 130 in a third user group, and so forth. The AP may rotate through the user groups so that each group can share the radio to transmit packets to the user devices. The embodiments herein can be used to reduce the latency that the packets for the user groups sit in the queue while waiting for their turn to be transmitted.

Figure 3:
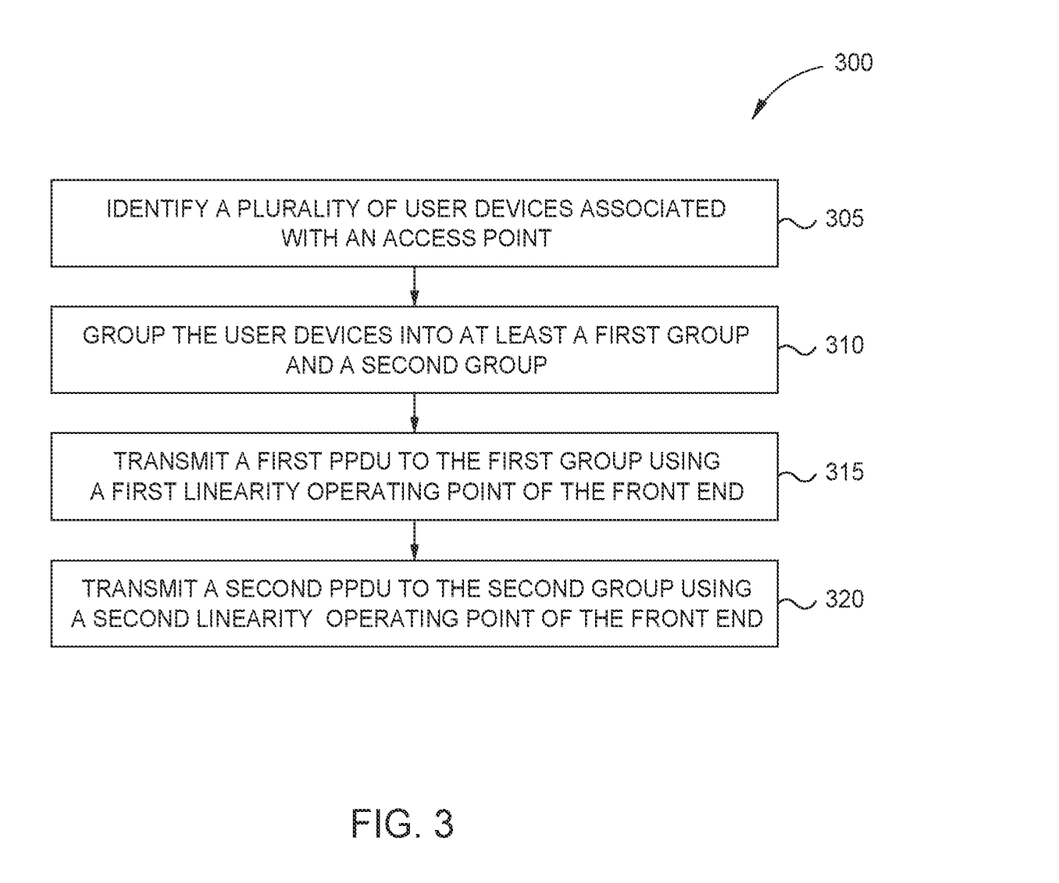
FIG. 3 is a flowchart for using different linearity operating points of a front end for different groups of user devices, according to one embodiment.

FIG. 3 is a flowchart of a method 300 for using different linearity operating points of a front end for different groups of user devices, according to one embodiment. At block 305, the AP identifies a plurality of user devices associated with an access point. That is, the scheduler can track how many user devices are currently associated with the AP.

At block 310, the scheduler groups the user devices into at least a first group and a second group—e.g., the user groups 110 discussed in FIG. 1. That is, the scheduler assigns one or more of the user devices identified at block 305 into a first OFDMA user group while assigning one or more of the remaining user devices into a second OFDMA user group. While method 300 discusses two user groups, the scheduler may assign the associated user devices into any number of user groups.

The embodiments herein are not limited to any particular technique for assigning user devices into the first and second groups. The scheduler may use factors such as data rates, link budgets, user device proximity to the AP, multiple user devices being located in similar regions, SNR, and the like to assign the user devices into the groups. Moreover, the scheduler can consider the power consumed by the front end when operating at different linearity operating points. That is, while increasing the linearity of the front end can improve the latency in the queue for the PPDUs, it also consumes additional power. Thus, the scheduler can consider this tradeoff when determining which group (or groups) should be transmitted data using a higher linearity than the other group or groups. Examples of assigning user devices into different groups based on the factors discussed above are provided in more detail in FIG. 4.

In one embodiment, the scheduler is located on the AP. That is, the AP can use the scheduler to assign the associated user devices into the first and second groups. Alternatively, the scheduler (or a different entity tasked with assigning the user devices into user groups) may be located on a wireless controller. In that case, the wireless controller assigns the user devices into the first and second user groups and then informs the AP. For example, the AP can gather the information the wireless controller may use to decide how to group the user devices, such as data rate, link budget, proximity, etc., and send this information to the wireless controller so it can form the user groups.

At block 315, the AP transmits a first PPDU to the first group using a first linearity operating point of the front end. For example, the user devices in the first group may be in a similar area as each other in the environment, or the user devices may be similar distance from the AP, and thus, were assigned to the same group.

At block 320, the AP transmits a second PPDU to the second group using a second linearity operating point of the front end. Again, the user devices in the second group may be in a similar area as each other in the environment, or the user devices may be similar distances from the AP, and thus, were assigned to the same group. In one embodiment, the user devices in the first and second groups are mutually exclusive. That is, a user device is assigned to only one user group.

In one embodiment, the AP adjusts the linearity operating point of the front end by changing its operating voltage. For example, to transmit the first PPDU using a higher linearity operating point than the second PPDU, the AP may increase the operating voltage of the front end when transmitting the first PPDU relative to the operating voltage of the front end when transmitting the second PPDU.

Further, the AP may also use a different data rate or MCS level when transmitting the first and second PPDUs. For example, the first group may include user devices that are further from the AP than the user devices in the second group. Despite using a higher linearity operating point to transmit the first PPDU, the AP may use a lower MCS to transmit the first PPDU than when transmitting the second PPDU due to the relative distances of the user devices from the AP.

Figure 4:
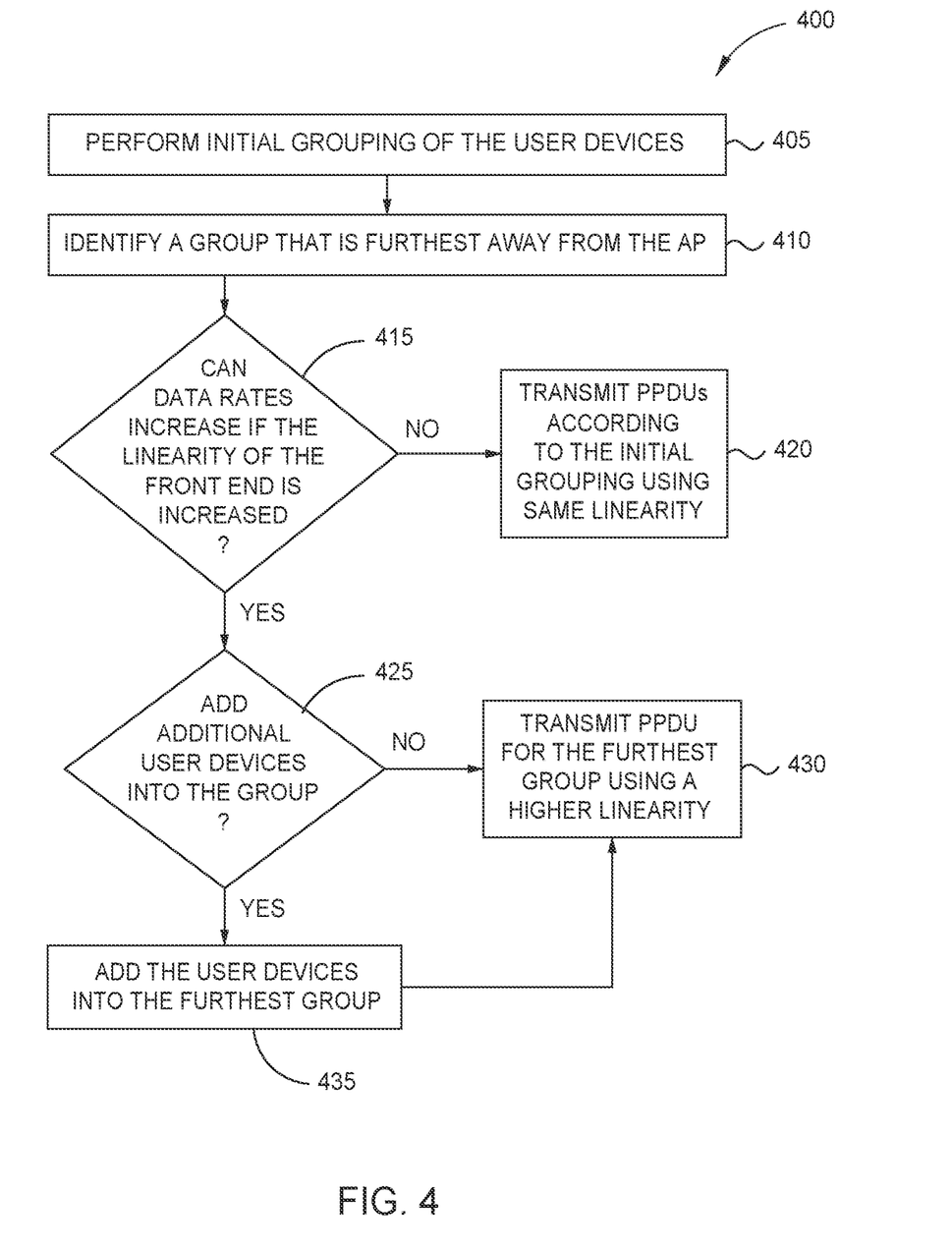
FIG. 4 is a flowchart for assigning a group of user devices a different linearity operating point of a front end, according to one embodiment.

FIG. 4 is a flowchart of a method 400 for assigning a group of user devices a different linearity operating point of a front end, according to one embodiment. In one embodiment, the method 400 can be used to assign the user devices into groups as described in block 310 of the method 300 in FIG. 3. However, the method 400 is just one example of assigning the user devices into user groups. The embodiments herein can be used with any technique that assigns user devices into different user groups.

At block 405, the scheduler performs an initial grouping of the user devices. The scheduler can use any known or future algorithm for grouping the user devices into user groups. When doing so, the scheduler may consider the data rates of the user devices, the link budgets corresponding to the user devices, the proximity of the user devices to the AP or themselves, geographic regions where the user devices are located, SNR, and the like. For example, the scheduler may place the user devices in the same region (e.g., the near, middle, and far regions) in the same user group. Or the scheduler may place the user devices that have similar corresponding MCS values in the same user group—e.g., the user devices that can support MCS 1-5 are in one user group, the user devices that can support MCS 6-7 are in another user group, and the user devices that can support MCS 8-10 are in another user group.

Figure 5A:
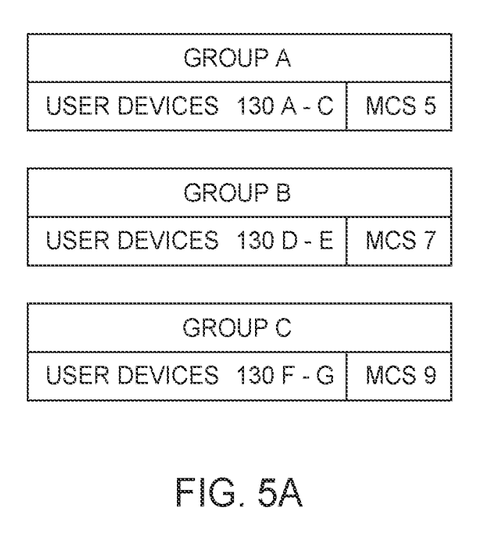
FIGS. 5A and 5B illustrate assigning user devices to different user groups, according to one embodiment.
Figure 5B:
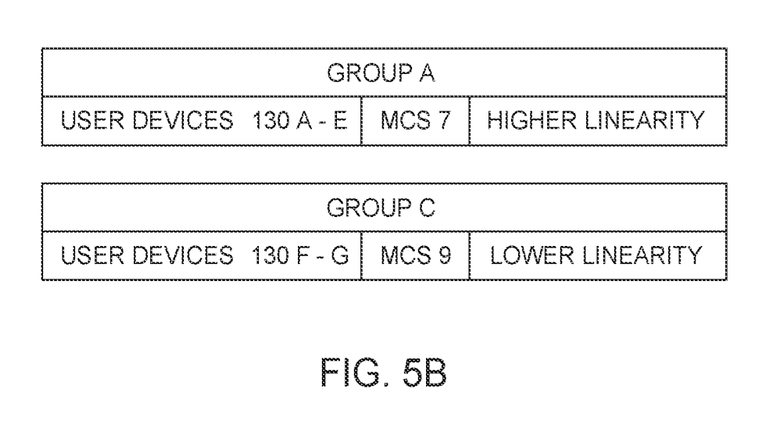

FIGS. 5A and 5B illustrate assigning user devices to different user groups, according to one embodiment. FIG. 5A illustrates grouping the user devices 130 in FIG. 1 according to an initial grouping as described at block 405 of the method 400. In this example, the user devices 130 in the same region are assigned to the same group. As shown, the user devices 130A-C are assigned to Group A, the user devices 130D-E are assigned to Group B, and the user devices 130F-G are assigned to Group C. The user devices in each group can each be assigned RUs that are transmitted in the same packet or PDDU. For example, the user devices 130A-C can be assigned different RUs in the same packet. The user devices 130D-G might also receive this packet, but since it is intended for a different user group, they will discard or ignore it.

FIG. 5A also illustrates the modulation scheme used by the AP when transmitting the packets for each of the groups. Because User Group A may be further from the AP (or due to interference), its packets can only be sent using MCS 5. Because Group B may be closer to the AP, its packets can be sent using MCS 7, while the packets for Group C are sent using MCS 9. As mentioned above, the MCS level may be set based on the worst user device in the user group. For example, the user devices 130B and 130C may be able to support MCS 6, but because user device 130A can only support MCS 5, then the packets for Group A can only be sent using MCS 5.

Returning to the method 400, at block 410 the scheduler identifies a user group that is furthest away from the AP. Using the example in FIG. 5A, Group A that contains the user devices 130A-C is the furthest from the AP.

At block 415, the scheduler determines whether the data rate (e.g., the MCS level) for the furthest group can be increased if the linearity of the front end is increased. For example, the scheduler can determine whether transmitting the packet to Group A when the front end operates at an increased linearity results in the user devices 130A-C being able to support a higher MCS level. For instance, instead of the user device 130A being able to support only MCS 5, increasing the linearity of the front end may result in the user device 130A instead supporting MCS 7. Similarly, the MCS values for the user devices 130B and 130C may also increase—e.g., from MCS 6 to MCS 8.

In one embodiment, the linearity of the front end is increased by increments. For example, the operating voltage can be incremented by 0.2V from a normal operating voltage of 4.2V up to a maximum of 5V, where each incremental voltage results in a corresponding increase in the linearity of the front end. Thus, the operating voltage may not have to be increased to the maximum operating voltage in order to improve the data rate of the user group. For example, increasing the operating voltage of the front end from 4.2V to 4.8V may be sufficient to enable the user device 130A to support MCS 7. The user device 130A may still support only MCS 7 even if the operating voltage of the front end is increased to the 5V maximum. Thus, the scheduler may identity an optimal increase in the operating voltage of the front end which increases its linearity, thereby increasing the data rate supported by a user device but does not unnecessary waste power (or only provides a small improvement in the data rate).

If increasing the linearity does not result in an increase in the rate at which data can be transmitted to the user group, the method 400 proceeds to block 420 where the AP transmits PDDUs according to the initial grouping using the same linearity of the front end. That is, because increasing the linearity did not increase the data rate, operating the front end at a higher linearity would not improve latency and may waste power unnecessarily. In that case, the AP can transmit the PDDUs using the initial user group determined at block 405 (e.g., the user groups illustrated in FIG. 5A).

In another embodiment, if increasing the linearity of the front end does not improve the data rate of the user group furthest from the AP, the scheduler may also consider whether increasing the linearity may help the user group that is the next furthest from the AP. That is, in other embodiments, the scheduler can also consider other user groups besides the one containing the user devices furthest from the AP to see if increasing the linearity of the front end for those groups will reduce latency in the transmission queue.

Assuming that increasing the linearity does improve the data rate for the further user group, the method 400 proceeds to block 425 where the scheduler determines whether it should add additional user devices into the user group. As mentioned above, being able to combine user groups can also reduce latency. Thus, the scheduler can determine whether increasing the linearity enables it to add user devices into the user group that is furthest from the AP.

Again using FIG. 5A as an example, assume that increasing the linearity means the user devices 130A-C can support MCS 7. The scheduler already knows that the user devices 130D-E in Group B can also support MCS 7. As such, the scheduler can add the user devices 130D-E into Group A, which eliminates Group B. In one embodiment, the scheduler can identify the user device in the group that supports the worst MCS and compare that MCS to the user devices in a neighboring group. If the MCS level for the neighboring group is equal to or less than the worst MCS, that the user devices in the neighboring group can be added to the furthest group.

This result is shown in FIG. 5B where Group A now includes user devices 130A-E while Group C remains unchanged. Further, FIG. 5B shows that Group A corresponds to the front end operating at a higher linearity (in order to achieve MCS 7) while Group C is transmitted packets with the front end operating at the lower linearity. While both Group A and Group C may both be operated at the higher linearity, doing so may not provide a benefit to Group C (e.g., it can still support only MCS 9 rather than support a higher MCS) or the incremental increase in the data rate for Group C may not be enough to justify the additional power being consumed by the front end. Thus, FIG. 5B illustrates a situation where at least one OFDMA user group is transmitted packets while the front end operates at a higher linearity and where another OFDMA user group is transmitted packets while the front end operates at a lower linearity. Of course, in other embodiments, the AP may have multiple user groups that operate when the front end is at a higher linearity, or multiple user groups that operate when the front end is at a lower linearity. For example, the scheduler may instead choose to maintain the same user groups shown in FIG. 5A but operate both Group A and Group B at the higher linearity. In that example, the user devices in Group A may use MCS 7 while the user devices in Group B may support MCS 8. Further, the scheduler may consider caps or limits to the number of user devices that can be added to a user group. That is, OFDMA can stipulate that only a certain number of user devices can be added to a group. Thus, the scheduler may have limit on the number of user devices that can be added to the group at block 425.

Assuming that the scheduler determines to add or more user devices to the group, the method 400 proceeds to block 435 where the scheduler adds the user devices into the furthest group, e.g., as shown in FIG. 5B. The method 400 then proceeds to block 430 where the new user groups are used for OFDMA, where the furthest user group is transmitted data using the higher linearity operating point of the front end. If the scheduler decides not to add any user devices to the furthest group at block 425, then the method bypasses block 435 and proceeds directly to block 430.

In sum, the method 400 illustrates techniques for improving the data rate for at least one group by operating a front end at a higher linearity, which can reduce the latency in a transmission queue of OFDMA packets. Further, the overall number of user groups can be reduced by combining another group with the group operating at the higher linearity, which can further reduce the latency in the transmission queue.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    grouping a plurality of devices associated with an access point into at least a first group and a second group as part of orthogonal frequency-division multiple access (OFDMA) based on portions of the plurality of devices being at least one of in a similar area or a similar distance from the access point, wherein grouping the plurality of devices comprises determining a location of each of the plurality of devices relative to the access point based on a link budget, supported data rates, and a modulation coding scheme (MCS) level for each of the plurality of devices, and wherein the first group corresponds to a different linearity operating point of a front end in the access point than the second group;
    transmitting a first physical layer protocol data unit (PPDU) for the first group using a first linearity operating point of the front end; and
    transmitting a second PPDU for the second group using a second linearity operating point of the front end.

2. The method of claim 1, wherein the first PPDU contains data corresponding to resource units (RUs) for the first group, wherein the second PPDU contains data corresponding to RUs for the second group, wherein both the first group and the second group comprises multiple ones of the plurality of devices.

3. The method of claim 1, wherein the front end operates with a higher operating voltage at the first linearity operating point than the second linearity operating point.

4. The method of claim 1, wherein the first group contains devices that are further from the access point than devices in the second group.

5. The method of claim 1, wherein transmitting the first PPDU for the first group using the first linearity operating point of the front end results in the first PPDU being transmitted at a greater MCS level than if the second linearity operating point of the front end were used.

6. A non-transitory computer readable medium having program instructions embodied therewith, the program instructions executable by a processor to perform an operation, the operation comprising:
    receiving a grouping of a plurality of devices associated with an access point into at least a first group and a second group as part of OFDMA, wherein the grouping of the plurality of devices is performed by determining a location of each of the plurality of devices relative to the access point based on a link budget, supported data rates, and a modulation coding scheme (MCS) level for each of the plurality of devices, and wherein the grouping of the plurality of devices is further based on portions of the plurality of devices being at least one of in a similar area or a similar distance from the access point, and wherein the first group corresponds to a different linearity operating point of a front end in the access point than the second group;

transmitting a first physical layer protocol data unit (PPDU) for the first group using a first linearity operating point of the front end; and transmitting a second PPDU for the second group using a second linearity operating point of the front end.

7. The non-transitory computer readable medium of claim 6, wherein the first PPDU contains data corresponding to resource units (RUs) for the first group, wherein the second PPDU contains data corresponding to RUs for the second group, wherein both the first group and the second group comprises multiple ones of the plurality of devices.

8. The non-transitory computer readable medium of claim 6, wherein the front end operates with a higher operating voltage at the first linearity operating point than the second linearity operating point.

9. The non-transitory computer readable medium of claim 6, wherein the first group contains devices that are further from the access point than devices in the second group.

10. The non-transitory computer readable medium of claim 6, wherein transmitting the first PPDU for the first group using the first linearity operating point of the front end results in the first PPDU being transmitted at a greater MCS level than if the second linearity operating point of the front end were used.

11. An access point, comprising:
a radio comprising a front end; and
a scheduler configured to:
receive a grouping of a plurality of devices associated with the access point into at least a first group and a second group as part of OFDMA, wherein the grouping of the plurality of devices is performed by determining a location of each of the plurality of devices relative to the access point based on a link budget, supported data rates, and a modulation coding scheme (MCS) level for each of the plurality of devices, and wherein the grouping of the plurality of devices is further based on portions of the plurality of devices being at least one of in a similar area or a similar distance from the access point, and wherein the first group corresponds to a different linearity operating point of a front end in the access point than the second group, transmit a first physical layer protocol data unit (PPDU) for the first group using a first linearity operating point of the front end, and transmit a second PPDU for the second group using a second linearity operating point of the front end.

12. The access point of claim 11, wherein the first PPDU contains data corresponding to resource units (RUs) for the first group, wherein the second PPDU contains data corresponding to RUs for the second group, wherein both the first group and the second group comprises multiple ones of the plurality of devices.

13. The access point of claim 11, wherein the front end operates with a higher operating voltage at the first linearity operating point than the second linearity operating point.

14. The access point of claim 11, wherein the first group contains devices that are further from the access point than devices in the second group.

15. The access point of claim 11, wherein transmitting the first PPDU for the first group using the first linearity operating point of the front end results in the first PPDU being transmitted at a greater modulation coding scheme level than if the second linearity operating point of the front end were used.

16. The access point of claim 11, wherein the front end comprises circuitry coupled to an antenna of the access point configured to communicate with the plurality of devices.

17. The access point of claim 16, wherein the front end comprises at least one amplifier and mixer.

\* \* \* \* \*